United States Patent [19]
Marmer

[11] Patent Number: 5,418,000
[45] Date of Patent: May 23, 1995

[54] SWORDFISH RIB FOOD PRODUCT AND PROCESS OF PREPARING

[76] Inventor: Stephen Marmer, 138 Meadowbrook Dr., Huntingdon Valley, Pa. 19006

[21] Appl. No.: 275,572

[22] Filed: Jul. 15, 1994

[51] Int. Cl.[6] .............................................. A23L 1/325
[52] U.S. Cl. .................................. 426/643; 426/479; 426/518; 452/161
[58] Field of Search ................. 426/643, 479, 518; 452/161

[56] References Cited

U.S. PATENT DOCUMENTS

| | | |
|---|---|---|
| 2,704,377 | 3/1955 | Baader . |
| 2,827,383 | 3/1958 | Gorton ............................ 426/479 X |
| 2,954,298 | 9/1960 | Anderson et al. ............... 426/643 X |
| 3,082,094 | 3/1963 | Kramer ............................ 426/518 X |
| 3,152,912 | 10/1964 | Carruthers et al. ............. 426/479 |
| 3,321,801 | 5/1967 | Westerdahl . |
| 3,593,370 | 7/1971 | Lapeyre ......................... 426/518 X |
| 3,594,191 | 7/1971 | Lapeyre ......................... 426/479 X |
| 5,106,334 | 4/1992 | Kristinsson . |

Primary Examiner—Arthur L. Corbin
Attorney, Agent, or Firm—Caesar, Rivise, Bernstein, Cohen & Pokotilow, Ltd.

[57] ABSTRACT

Food products and methods of making them from the vertebral column and some contiguous flesh of a sport fish, e.g., a swordfish. The food product is a transverse section of the fish to simulate beef or pork spare ribs. In one embodiment the transverse section comprises portions of two immediately adjacent vertebrae, associated ribs, and a thin layer of the flesh contiguous therewith. In the other embodiment the transverse section comprises a vertebra, an associated rib, and a thin layer of flesh contiguous therewith. Both embodiments are formed by cutting away portions of the flesh and all of skin of the fish and severing the vertebrae to expose the interior cavity/cavities within the vertebra/vertebrae making up the transverse section so that the marrow is removed therefrom. The food product can be packaged either individually or in multiples within a sealed package, and can be frozen. The food product may also be marinated, e.g., provided with a barbecue sauce thereon.

30 Claims, 3 Drawing Sheets

FIG. 6
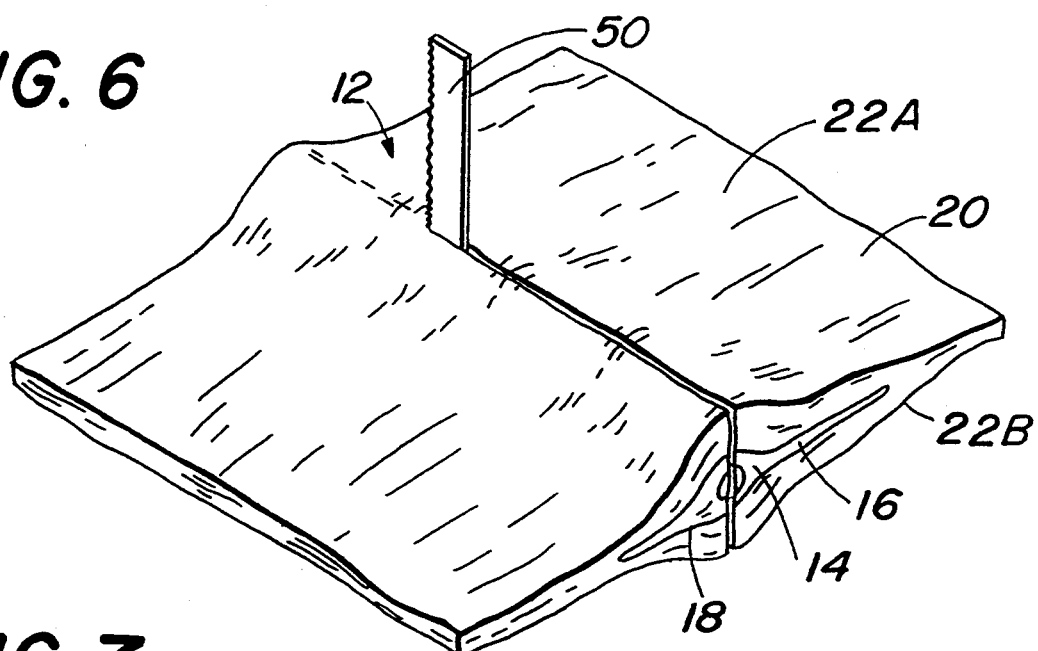
FIG. 7
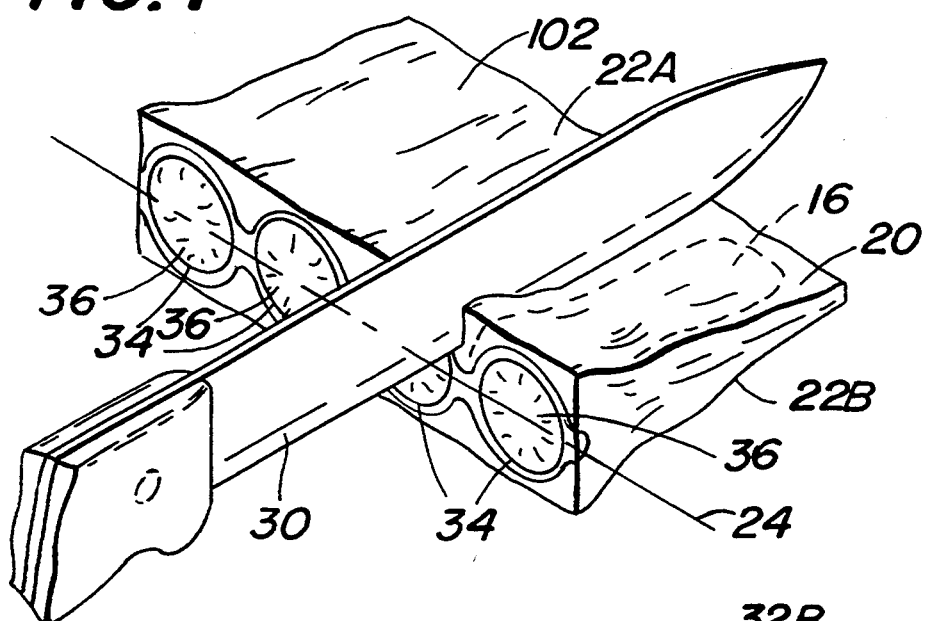
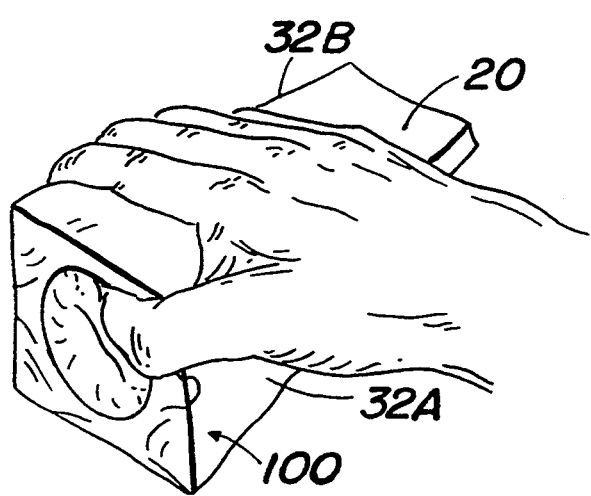
FIG. 8

SWORDFISH RIB FOOD PRODUCT AND PROCESS OF PREPARING

BACKGROUND OF THE INVENTION

This invention relates generally to food products made from fish and more particularly to a food product made from a swordfish, which simulates spare ribs made from bovine or swine animals.

Various types of apparatus and methods for preparing or butchering fish are known. U.S. Pat. No. 3,593,370 (Lapeyre) discloses a butchering method for tuna while in the frozen state. The fish is cut into segments transverse to the spine or backbone, and then the skin, the plug of viscera and the skeletal structure is removed, leaving only the edible portions of the fish.

U.S. Pat. No. 2,704,377 (Baader) discloses an apparatus to remove the backbone of fish wherein two cutting blades converge between the backbone and the back of the fish. This obviates the need for special tools to remove the backbone and makes the removal easier.

U.S. Pat. No. 3,321,801 (Westerdahl) discloses an apparatus and a method for separating the flesh from ribs and vertebrae of fish. The fish is first flattened on its belly, thereby flattening and spreading the ribs and vertebrae and making the separation much easier.

U.S. Pat. No. 5,106,334 (Kristinsson) discloses an apparatus to remove the spines, headbone and organs from the front part of a fish.

The patents disclose various means for removing the flesh attached to the vertebral column or the spine of the fish and for removing the vertebral column and the ribs. None of the patents disclose a fish food product which comprises the vertebrae, ribs and attached flesh and which simulates spare ribs which are presently derived from bovine and swine products.

OBJECTS OF THE INVENTION

Accordingly, it is the general object of this invention to provide a fish food product which is not presently known or available to the consuming public.

It is a further object of this invention to provide a fish food product which simulates spare ribs made from bovine or swine.

It is yet a further object of this invention to provide a fish food product which comprises the vertebrae and the ribs of a fish with the flesh attached thereto.

It is another object of this invention to provide a fish food product which comprises a plurality of transverse sections of the fish which can be frozen and packaged in individual compartments.

It is still another object of this invention to provide a fish food product which comprises individual sections produced by splitting each vertebra transversely.

It is still yet another object of this invention to provide a fish food product comprising individual sections which are produced by first longitudinally splitting the vertebral column in half and then transversely cutting the fish between each vertebra.

SUMMARY OF THE INVENTION

These and other objects of this invention are achieved by providing food products and methods of making the same. The food products formed from the vertebral column and some contiguous flesh of a sport fish, e.g., a swordfish. The vertebral column has a longitudinal axis and comprises plural vertebrae and plural ribs projecting generally transversely to the longitudinal axis, with each vertebra having an internal cavity therein through which the axis passes. Each of the cavities is filled with marrow. The food product is a transverse section of the fish.

In accordance with one aspect of the invention the transverse section of the fish comprises portions of two immediately adjacent vertebrae, associated ribs, and a thin layer of the flesh contiguous with the two vertebrae and the associated ribs. The remainder of the flesh and all of the skin of the fish is removed from the transverse section so that it has a pair of side surfaces extending along the longitudinal axis and a pair of end surfaces. Each of the end surfaces extends through a respective one of the two immediately adjacent vertebrae to expose the cavities therein for removal of the marrow within the exposed cavities, whereupon the food product is devoid of marrow.

In accordance with another aspect of the invention the transverse section of the fish comprises portions of one vertebra, the associated rib, and a thin layer of the flesh contiguous with the vertebra and the associated rib. The remainder of the flesh and all of the skin of the fish is removed from the transverse section so that it has a pair of side surfaces extending along the longitudinal axis, a pair of end surfaces, and a bottom surface. Each of the end surfaces extends transversely to the longitudinal axis on opposite sides of the vertebra. The bottom surface extends parallel to the longitudinal axis and through the vertebra to expose the cavity therein for removal of the marrow within the exposed cavity, whereupon the food product is devoid of marrow. In accordance with other aspects of this invention the food products as set forth above can be packaged either singly or in multiples within a package.

DESCRIPTION OF THE DRAWINGS

Other objects and many of the intended advantages of this invention will be readily appreciated when the same becomes better understood by reference to the following detailed description, when considered in connection with the accompanying drawings wherein:

FIG. 6 is a perspective view of a portion of a swordfish showing the formation of "fish ribs" constructed in accordance with a second embodiment, this arrangement being used when preparing larger fish than that used for the embodiment of FIG. 1;

FIG. 7 is a perspective view of a portion of the swordfish shown in FIG. 6 showing the transverse splitting of that portion into individual "fish ribs" of the second embodiment; and FIG. 8 is a perspective view of a transverse split portion of the swordfish shown produced by the operation shown in FIG. 7 so that marrow can be removed from the vertebrae to complete the second embodiment of the "fish rib".

DETAILED DESCRIPTION OF THE PREFERRED EMBODIMENTS

Figure 1:
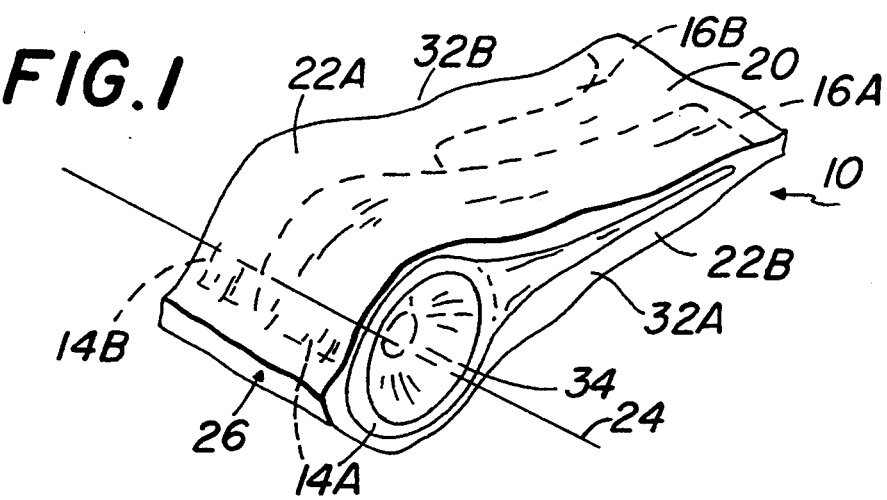
FIG. 1 is a perspective view of a food product made up of a transverse section of a portion of a fish, e.g., a swordfish, in accordance with this invention to form what can be called an individual "fish rib" simulating a conventional a beef or pork spare rib.

Referring now in greater detail to the various figures of the drawing wherein like reference characters refer to like parts, there is shown in FIG. 1, one embodiment of a "fish rib" 10 constructed in accordance with this invention. The fish rib is formed by transversely sectioning a portion 12 (FIG. 2) of the vertebral column and contiguous flesh of a sport fish, e.g., a swordfish. The portion 12 of the swordfish has heretofore been discarded as scrap, but is now used as the starting material for forming the fish ribs of this invention. As such the portion 12 will be referred to hereinafter as the "starting" portion. Other sport fish can be used to provide the starting portion 12 of the vertebral column and contiguous flesh for forming the "fish ribs" of this invention.

Figure 4:
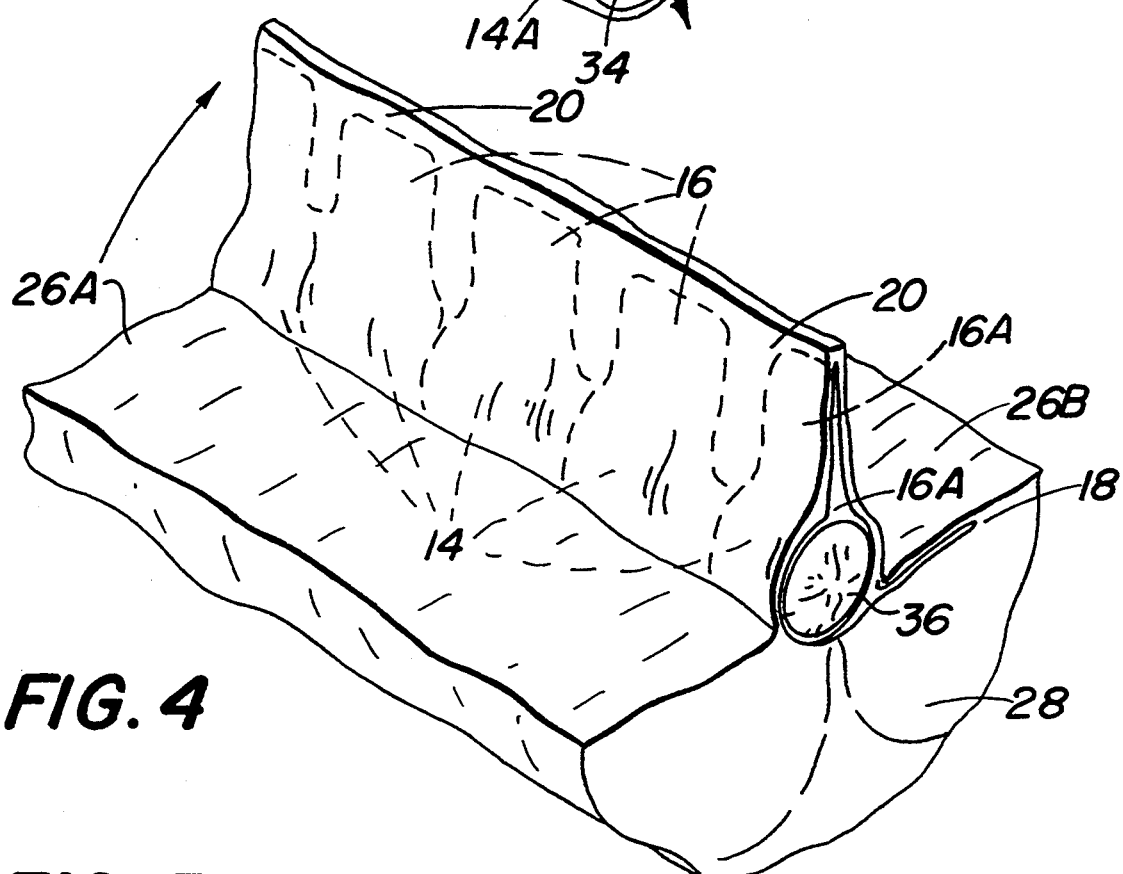
FIG. 4 is a perspective view of the lower quadrant of a swordfish showing the removal, e.g., cutting away, of a portion of the vertebral column with attached ribs and flesh therefrom so that the "fish rib" of FIG. 1 can be produced therefrom.

As can be seen clearly in FIG. 4 the vertebral column of the swordfish basically comprises a plurality of vertebrae 14. A pair of ribs 16 and 18 project outward diametrically from each vertebra 14 (albeit the ribs 16 are shown in FIG. 4 after they are bent so that then are perpendicular to the ribs 18). The starting portion 12 basically comprises the vertebral column with the ribs 18 removed therefrom, thereby leaving the ribs 16, and the closely adhering contiguous flesh 20.. The surface of that flesh forms a pair of sides 22A and 22B which extend along the longitudinal axis 24 of the vertebral column. Portions of the sides 22A and 22B may also be made up by the surfaces of the vertebrae 14 and ribs 16 themselves.

The starting portion 12 is formed by severing the swordfish's body into two slabs or flanks longitudinally on opposite sides of the vertebral column along coplanar sever planes 26A and 26B (FIG. 4). A slab or flank (not shown) of the swordfish is then removed for ordinary purposes, e.g., to form swordfish steaks. Then the portion of the swordfish enclosing the vertebral column and the ribs 16 which remains attached to slab 28 is bent upward as shown in FIG. 4. The portion which is bent up is then severed along the planes 26A and 26B and removed to form the starting portion 12. The ribs 18 are removed from the flank portion 28 and are discarded as scrap and the flank portion 28 used for ordinary purposes, e.g., to form swordfish steaks.

Figure 2:
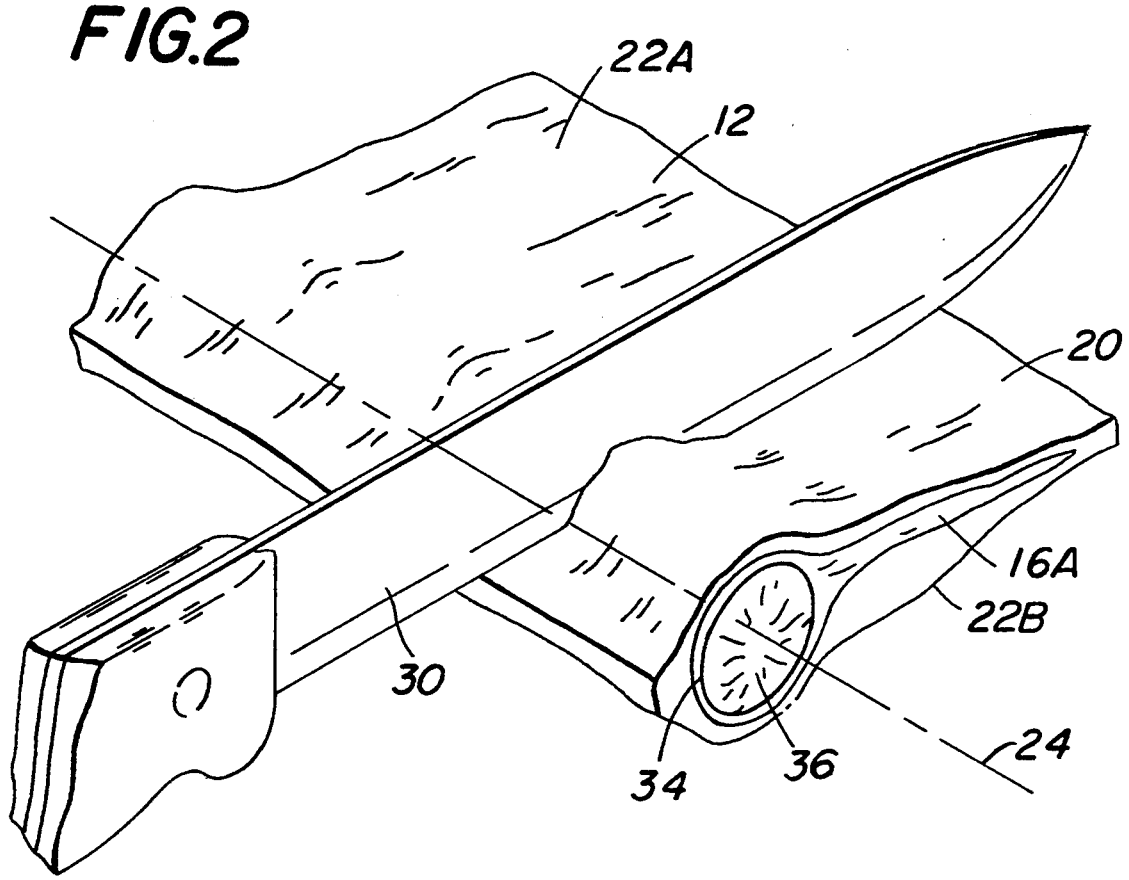
FIG. 2 is a perspective view of a portion of a swordfish being cut into individual transverse sections to form individual "fish ribs" in accordance with a first embodiment of this invention.

Once the starting portion is removed from the flank 28 it is ready to be used to form the "fish ribs" of this invention. In particular, to form the "fish rib" 10 of the first embodiment of this invention the starting portion 12 is severed transversely, e.g., cut with a knife 30, as shown in FIG. 2. In particular the knife is used to cut transversely, i.e., perpendicular to the longitudinal axis 24, through the middle of each vertebra 14 and its associated ribs 16 to form plural transverse sections 26. Each transverse section 26 thus includes two half portions 14A and 14B of adjacent vertebrae 14 and two half portions 16A and 16B, respectively, of their associated ribs. When severed thusly each of the transverse sections includes a pair of end surfaces 32A and 32B.

Figure 3:
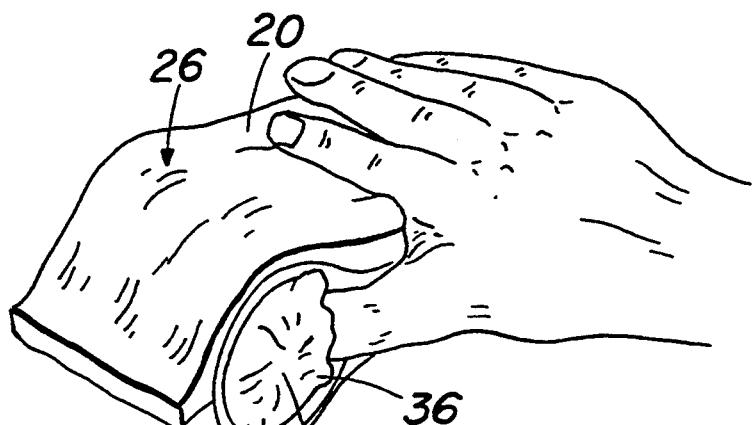
FIG. 3 is a perspective view showing the formation of the individual "fish rib" of FIG. 1 during the removal of the marrow from the vertebrae thereof.

Each of the vertebrae of the swordfish includes an interior cavity 34 in which the fish's marrow 36 is contained. Thus, when the vertebrae are split transversely as shown in FIG. 2 the cavities 34 are split in half and are open to the end surfaces of the transverse section so that the marrow 36 in each end cavity can be manually removed therefrom, e.g., popped-out, as shown in FIG. 3, thereby resulting in a "fish rib" devoid of marrow. The fish rib may be frozen for substantially later use or may be merely refrigerated for timely use.

As should be appreciated by those skilled in the art the "fish ribs" of this invention can be cooked, e.g., grilled, like conventional spare ribs, and if desired can be coated with a marinade, e.g., a barbecue sauce.

Figure 5:
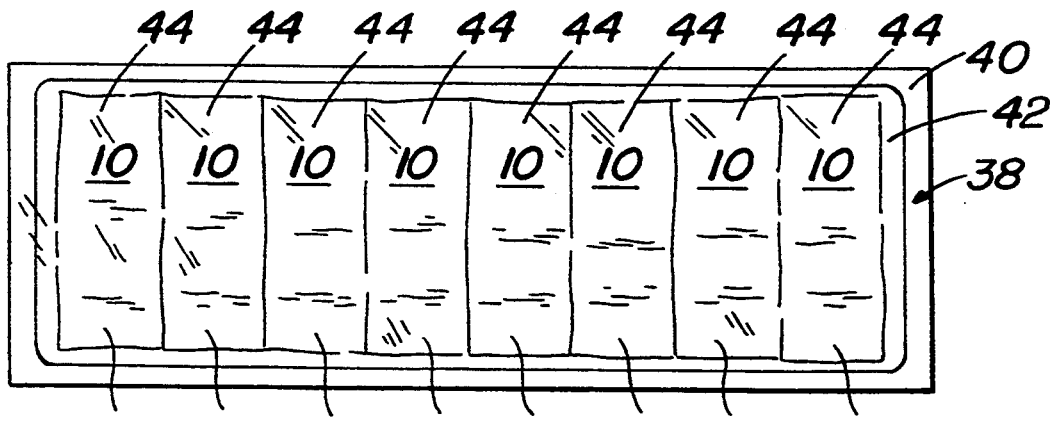
FIG. 5 is a reduced size, top plan view of the package used for holding plural "fish rib" constructed in accordance with this invention, with said package having individual compartments for the "fish rib" to permit freezing thereof, and subsequent sale to a consumer.

FIG. 5 shows one package 38 for plural individual fish ribs formed in accordance with this invention. The package 38 has an outer tray 40 and an inner part 42. The inner part 32 is divided into compartments 44 sized to accommodate a respective "fish ribs" constructed in accordance with this invention. A cover or lid (not shown) extends over the outer tray and is secured to the periphery thereof to seal the fish ribs 10 within the package. If desired, one of the compartments can be used to hold a marinade, sauce, and/or condiments for use by the consumer in cooking the fish ribs. The entire package 38 may then be frozen for storage and shipment. Alternatively, the marinade can be directly applied to the fish ribs before they are located in the package, instead of having the marinade stored in one compartment of the package or elsewhere.

In FIGS. 6-8 there is shown the formation of second embodiments of the fish ribs 100 (FIG. 8) of this invention. The fish ribs 100 are produced from larger sized fish than that used to produce the ribs 10. The ribs 100 are similar to fish ribs 10 described heretofore, except that each fish rib 100 includes a half portion of one of the vertebra 14 and an associated rib 16 or 18. The fish ribs 100 are formed from a starting portion 102 (FIG. 7). The starting portion 102 is formed form a preliminary starting portion 12' which is identical to the starting portion 12 except that it includes both of the diametrically projecting ribs 16 and 18, instead of only the ribs 16. Since the preliminary starting portions 12' is identical to the starting portion 12, except for the difference just described, the same reference numerals will be given to the common components of those portions 12 and 12'.

The preliminary starting portion 12' is created in a similar manner to the starting portion 12, except that the ribs 18 are left secured to their associated vertebrae. The preliminary starting portion 12' is then severed longitudinally along its longitudinal axis, by any suitable means, e.g., a band saw 50, to form two starting portions 102, with one of the starting portions containing half of the vertebrae 14 and the associated ribs 16, and the other of the starting portions 103 containing the other half of the vertebrae 14 and the associated ribs 18. By splitting the preliminary starting portion 12' longitudinally the cavities 34 are also split in half thereby exposing the marrow 36 therein.

The starting portion 102 containing the ribs 16 can then be severed transversely by the knife 30 between the immediately adjacent ribs 16 as shown in FIG. 7 to create the plural transverse sections making up the "fish ribs" 100. The starting portion 102 containing the ribs 18 can be similarly transversely sectioned. Once the starting portions have been sectioned the marrow can be removed manually from each section as shown in FIG. 8, thereby completing the "fish rib" 100.

The fish ribs of the second embodiment can packaged in the same manner as the fish ribs 10.

As should be appreciated from the foregoing a unique "fish ribs" food product can be readily made from what has heretofore been the waste product of sport fishes. Thus, the fish ribs of this invention makes maximum use of the available flesh of the fish since none of the flesh adhering to the vertebral column or the ribs of the fish is discarded, as is the present practice in butchering fish. Moreover, the resulting "fish ribs" simulates somewhat in appearance spare ribs made from bovine animal or swine, while provides a unique character and taste. The fish ribs can be frozen and packaged in individual compartments or in a common package, either together with marinades, sauces, or condiments, or by themselves. The "fish ribs" can be barbecued, grilled, marinated or served in other ways as are beef, pork, or other meat spare ribs.

Without further elaboration, the foregoing will so fully illustrate my invention, that others make by current or future knowledge, readily adapt the same for use under the various conditions of service.

I claim:

1. A food product formed from the vertebral column and some contiguous flesh of a sport fish, said vertebral column having a longitudinal axis and comprising plural vertebrae and plural ribs projecting generally transversely to said longitudinal axis, with each vertebra having an internal cavity therein through which said axis passes, each cavity being filled with marrow, said food product being a transverse section of said fish and comprising portions of two immediately adjacent vertebrae, associated ribs, and a thin layer of the flesh contiguous with said two vertebrae and said associated ribs, with the remainder of the flesh and all of the skin of said fish being removed, whereupon said transverse section has a pair of side surfaces extending along said longitudinal axis and a pair of end surfaces, each of said end surfaces extending through a respective one of said two immediately adjacent vertebrae to expose the cavities therein for removal of the marrow within said exposed cavities, whereupon said food product is devoid of said marrow.

2. The food product of claim 1 wherein said sport fish is a swordfish.

3. The food product of claim 1 wherein said food product includes a marinade.

4. The food product of claim 1 wherein said food product is frozen.

5. The food product of claim 1 wherein said food product is disposed within a package.

6. The food product of claim 5 wherein said food product is frozen.

7. The food product of claim 1 comprising a plurality of said food products disposed and sealed within a package.

8. The food product of claim 7 wherein said package includes a plurality of compartments, each of said compartments having a respective food product therein.

9. A food product formed from the vertebral column and some contiguous flesh of a sport fish, said vertebral column having a longitudinal axis and comprising plural vertebrae and plural ribs projecting generally transversely to said longitudinal axis, with each vertebra having an internal cavity therein through which said axis passes, each cavity being filled with marrow, said food product being a transverse section of said fish and comprising a portion of one vertebra, an associated rib, and a thin layer of the flesh contiguous with said one vertebra and said associated rib, with the remainder of the flesh and all of the skin of said fish being removed, whereupon said transverse section has a pair of side surfaces extending along said longitudinal axis, a pair of end surfaces, and a bottom surface, each of said end surfaces extending transversely to said longitudinal axis on opposite sides of said vertebra, said bottom surface extending parallel to said longitudinal axis and through said one vertebra to expose the cavity therein for removal of the marrow within said exposed cavity, whereupon said food product is devoid of said marrow.

10. The food product of claim 9 wherein said sport fish is a swordfish.

11. The food product of claim 9 wherein said food product includes a marinade.

12. The food product of claim 9 wherein said food product is frozen.

13. The food product of claim 9 wherein said food product is disposed within a package.

14. The food product of claim 13 wherein said food product is frozen.

15. The food product of claim 9 comprising a plurality of said food products disposed and sealed within a package.

16. The food product of claim 15 wherein said package includes a plurality of compartments, each of said compartments having a respective food product therein.

17. A method of producing a food product from the vertebral column and some contiguous flesh of a sport fish, said vertebral column having a longitudinal axis and comprising plural vertebrae and plural ribs projecting generally transversely to said longitudinal axis, with each vertebra having an internal cavity therein through which said axis passes, each cavity being filled with marrow, said method comprising cutting said fish to produce a transverse section comprising portions of two immediately adjacent vertebrae and associated ribs and a thin layer of the flesh contiguous with said two vertebrae and associated ribs, with the remainder of the flesh and all of the skin of said fish being removed, whereupon said transverse section has a pair of side surfaces extending along said longitudinal axis and a pair of end surfaces, each of said end surfaces extending through a respective one of said two immediately adjacent vertebrae to expose the cavities therein, and removing the marrow within said exposed cavities, whereupon said food product is devoid of said marrow.

18. The method of claim 17 additionally comprising the step of packaging said food product within a package.

19. The method of claim 18 additionally comprising the step of freezing said food product.

20. The method of claim 17 additionally comprising the step of producing plural food product and packaging said plural food products within a package.

21. The method of claim 20 wherein said package comprises plural compartments and wherein said method comprises placing each of said plural food products in a separate compartment.

22. The method of claim 17 wherein said method comprises selecting a swordfish as said sport fish.

23. The method of claim 22 additionally comprising providing a marinade on said food product.

24. A method of producing a food product from the vertebral column and some contiguous flesh of a sport fish, said vertebral column having a longitudinal axis and comprising plural vertebrae and plural ribs projecting generally transversely to said longitudinal axis, with each vertebra having an internal cavity therein through which said axis passes, each cavity being filled with marrow, said method comprising cutting said fish to produce a transverse section comprising a vertebra, an associated rib, and a thin layer of the flesh contiguous with said vertebra and associated rib, with the remainder of the flesh and all of the skin of said fish being removed, whereupon said transverse section has a pair of side surfaces extending along said longitudinal axis, a pair of end surfaces, and a bottom surface, each of said end surfaces extending transversely to said longitudinal axis on opposite sides of said vertebra, said bottom surface extending parallel to said longitudinal axis and through said one vertebra to expose the cavity therein, and removing the marrow within said exposed cavity, whereupon said food product is devoid of said marrow.

25. The method of claim 24 additionally comprising the step of packaging said food product within a package.

26. The method of claim 24 additionally comprising the step of freezing said food product.

27. The method of claim 24 additionally comprising the step of producing plural food products and packaging said plural food products within a package.

28. The method of claim 27 wherein said package comprises plural compartments and wherein said method comprises placing each of said plural food products in a separate compartment.

29. The method of claim 24 wherein said method comprises selecting a swordfish as said sport fish.

30. The method of claim 24 additionally comprising providing a marinade on said food product.

* * * * *